United States Patent
Batchu et al.

(10) Patent No.: US 9,349,018 B1
(45) Date of Patent: May 24, 2016

(54) PREVENTING CONTENT DATA LEAK ON MOBILE DEVICES

(71) Applicant: MOBILE IRON, INC., Mountain View, CA (US)

(72) Inventors: Suresh Kumar Batchu, Milpitas, CA (US); Mansu Kim, Cupertino, CA (US); Joshua Sirota, Los Altos, CA (US)

(73) Assignee: MOBILE IRON, INC., Mountain View, CA (US)

(*) Notice: Subject to any disclaimer, the term of this patent is extended or adjusted under 35 U.S.C. 154(b) by 0 days.

(21) Appl. No.: 13/946,218

(22) Filed: Jul. 19, 2013

Related U.S. Application Data

(60) Provisional application No. 61/673,694, filed on Jul. 19, 2012.

(51) Int. Cl.
*H04L 29/00* (2006.01)
*G06F 21/62* (2013.01)

(52) U.S. Cl.
CPC .................. *G06F 21/6209* (2013.01)

(58) Field of Classification Search
CPC .................. H04W 4/00; G06E 1/00
USPC ............................................. 705/15; 370/338
See application file for complete search history.

(56) References Cited

U.S. PATENT DOCUMENTS 7,774,231 B2 * 8/2010 Pond et al. ....................... 705/15
8,630,275 B2 * 1/2014 Ji et al. .......................... 370/338

OTHER PUBLICATIONS

Navid Ranjbar, Mandi Abdinejad/ Authentication and Authorization for Mobile Devices/ Jun. 2012/University of Gothenburg/pp. 1-15.*

* cited by examiner

*Primary Examiner* — Brandon Hoffman
*Assistant Examiner* — Michael D Anderson
(74) *Attorney, Agent, or Firm* — Van Pelt, Yi & James LLP

(57) ABSTRACT

Preventing enterprise or other protected content data from "leaking" from being under secure management on a device, for example by virtue of being viewed using an untrusted app on the device, is disclosed. An indication is received that a content to be provided to a first mobile application on a mobile device is to be protected against unauthorized access at the mobile device using unauthorized applications other than the first mobile application. The content is encrypted while in transit to the mobile device, using a key associated with a second mobile application authorized to be used to access the content at the mobile device.

26 Claims, 14 Drawing Sheets

PREVENTING CONTENT DATA LEAK ON MOBILE DEVICES

CROSS REFERENCE TO OTHER APPLICATIONS

This application claims priority to U.S. Provisional Patent Application No. 61/673,694 entitled PREVENTING CONTENT DATA LEAK ON MOBILE DEVICES filed Jul. 19, 2012 which is incorporated herein by reference for all purposes.

BACKGROUND OF THE INVENTION

When an email downloaded using an email application on a mobile device includes an attachment, the attachment typically can be opened in any external application (viewer, editor, etc.) that has registered with the mobile operating system as an application available to open files of that type, e.g., .doc, .pdf, .txt, etc. This way, email applications can hand over the attachment to an external viewer or editor. These external applications make a copy of these attachments in their local data store on the mobile device and also in some cases may copy them to the cloud, resulting in a loss of control over where the documents end up. Similar so-called "leakage" of content data, e.g., from a trusted application to an untrusted one, may occur when other mobile clients are used to download content to a mobile device, e.g., a file server, content management service, etc., such as Microsoft SharePoint®, and content is of a type that untrusted applications on the mobile device may be registered to be used to access.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to limit access to enterprise content data, such as email attachments, files, other documents and objects, etc., to authorized applications only are disclosed. In various embodiments, email attachments and/or other content items are encrypted while in transit, e.g., to a mobile device. Access to a key required to decrypt the content at the mobile device is provided only to one or more authorized applications, which are authorized (for example, by an enterprise or other owner of the content) to be used to view and/or otherwise access the content on the mobile device. In some embodiments, the file name or other content type (e.g., MIME type) is modified in transit, so that the attachment or other content item will only be recognized and therefore made available to be opened by an authorized app on the mobile device, i.e., one or more authorized apps that have been configured to register to be used for content of that type.

Figure 1:
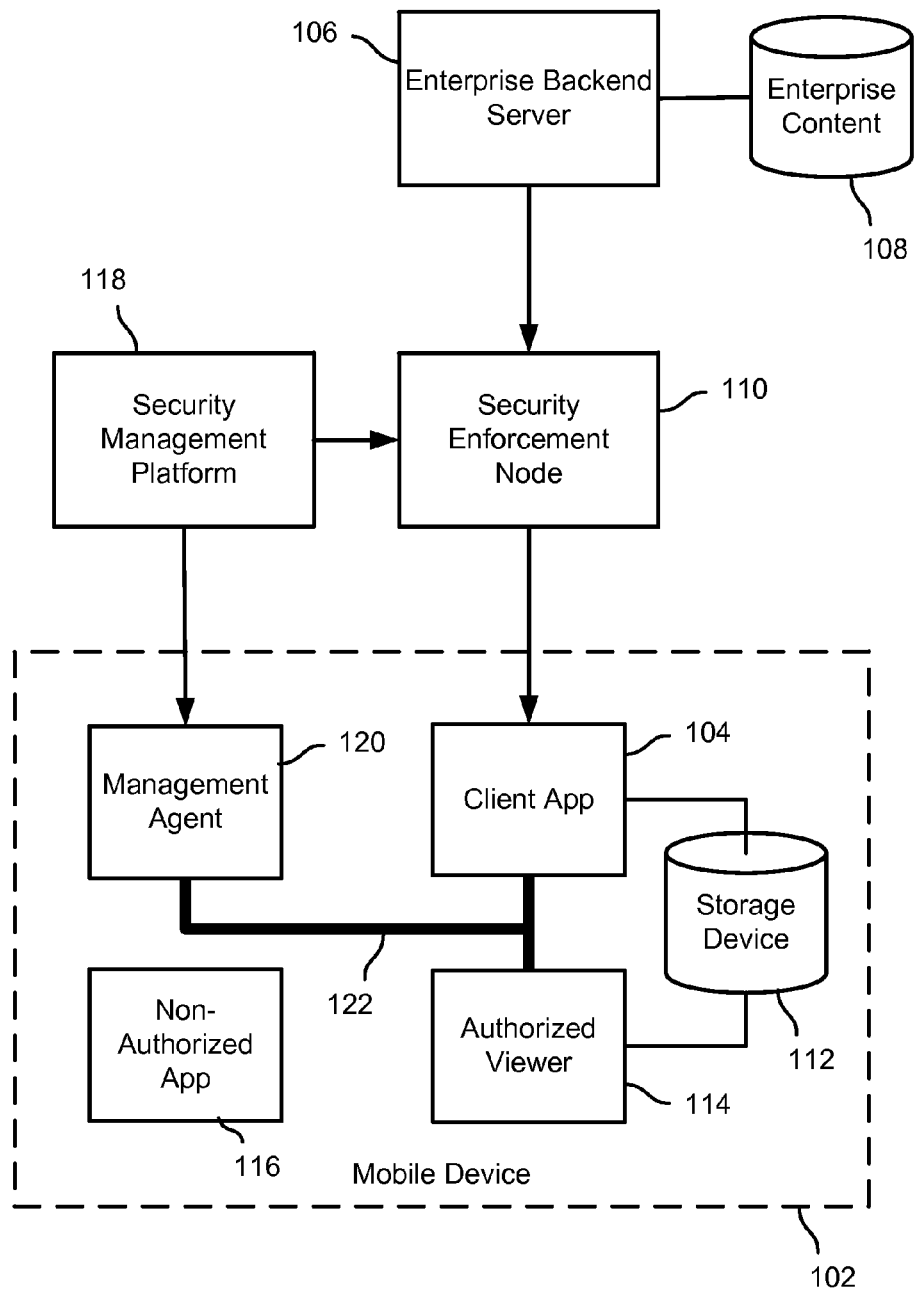
FIG. 1 is a block diagram illustrating an embodiment of a system to prevent unauthorized access to content downloaded to a mobile device.

FIG. 1 is a block diagram illustrating an embodiment of a system to prevent unauthorized access to content downloaded to a mobile device. In the example shown, a mobile device 102 includes a processor (not shown) configured to run a mobile operating system (not shown) such as Apple Inc.'s iOS® or Google, Inc.'s Android® mobile operating system. A mobile client application 104 running on the mobile operating system, e.g., an email or content management client app, is used in the example shown to download content from an enterprise backend server 106, which in the example shown provides access to content stored in an enterprise content store 108. For example, client app 104 may be an email app configured to send/receive email messages, including by synchronizing message store in a backend email server (e.g., server 106), such as a Microsoft Exchange® server and/or some other server configured to provide access to email, or other content, via ActiveSync® or some other protocol.

In the example shown in FIG. 1, communications sent between enterprise backend server 106 and mobile device 102 passes through a security enforcement node 110. In various embodiments, security enforcement node 110 comprises a reverse proxy for all synchronization or other traffic between client apps on mobile device 102 and enterprise servers such as backend server 106. In the case of email, for example, in various embodiments security enforcement node 110 relays traffic between mobile devices, such as mobile device 102, and a backend email server (e.g., Microsoft Exchange® server) or proxy for other email traffic (e.g., IMAP, MAPI, and SMTP). In the case of content management and/or file or other content sharing services, such as SharePoint®, WebDAV, and file servers, the security enforcement node 110 in various embodiments servers as a proxy (e.g. reverse proxy) for the applicable protocol (e.g., Microsoft SharePoint®, WebDAV, or file server protocols).

Content synchronized or otherwise downloaded to client app 104 may be stored by client app 104 in an associated app-specific local storage on a mobile storage device 112, e.g., a memory or disk. In the example shown, an authorized viewer (app) 114 may be used to view attachments or other content received by client app 104 from enterprise backend sever 106 via security enforcement node 110. Typically, if used to view content (e.g., open an email attachment) the authorized viewer 114 would store its own application-local copy of the content in its own app-specific data store on storage device 112.

Referring further to FIG. 1, techniques are disclosed to prevent an unauthorized mobile app, such as non-authorized app 116 in the example shown, from being used to view or otherwise access enterprise (or other protected) content. In various embodiments, a security management platform 118 (which may be on a same physical, logical, distributed, virtual, etc. system as security enforcement node 110 in some embodiments) generates and provides to security enforcement node 110 and one or more authorized apps, such as authorized viewer 114 in the example shown, an encryption key and/or other shared secret data to be used by the security enforcement node 110 to encrypt protected content (e.g., email attachments) while such content is in transit to mobile devices, such as mobile device 102. The authorized app(s) in turn use(s) the key (or other secret data) to decrypt and provide access to the content at the mobile device, e.g., by displaying the content in a viewer or other interface displayed on a display device comprising the mobile device. In the example shown in FIG. 1, the encryption key is provided to the authorized app(s) by security management platform 118 via a trusted management agent 120 (e.g., OS embedded Device Management Agent (e.g. iOS MDM) or a trust client app) on the mobile device 102.

In some embodiments, for additional protection, the encryption key may be encrypted and signed with PKI (public key infrastructure) type protection (e.g., a Common Access Card) by security management platform 118 before being delivered to the authorized app(s). The authorized app(s) can access the encryption key after verifying and decrypting the key using PKI (e.g., Common Access Card). In this way, access to the protected content is allowed only if the user provides the PKI key (e.g., using a Common Access Card) to the app. In such an approach, even if a device is lost or stolen and the device password is compromised, an unauthorized user who does not have the Common Access Card or other article embodying the key required to enable the otherwise authorized app(s) to access the encryption key needed to decrypt the protected content will not be able to access the protected content.

The management agent 120, enterprise client app 104, and authorized viewer 114 are configured in the example shown to share data in a trusted manner via a secure inter-app communication bus 122. For example, in some embodiments, content may be shared in a trusted manner among apps authorized to have access to the secure inter-app communication bus 122 by storing a copy in an encrypted form on a clipboard or other storage accessible to the entities authorized to communicate via the bus 122. Management agent 120 in some embodiments may, for example, store the encryption key or other content to be shared securely on a clipboard in an encrypted form. The authorized viewer 114 may then, for example, use a previously-shared key to decrypt the content that the management agent 120 stored on the clipboard in order to provide the content to the authorized viewer 114 and/or other intended recipient.

In various embodiments, an authorized app such as authorized viewer 114 may receive the key to be used to decrypt protected content via a mechanism other than as described above.

In some embodiments, security enforcement node 110 changes a file name, MIME, and/or other content type of enterprise content in transit to mobile devices such as mobile device 102. For examples, in some embodiments, a document (e.g., .doc file type) attached to an email may be encrypted by security enforcement node 110 and in addition may have the file type changed to a secure type, for example by appending a prescribed secure type suffix to the end of the filename or other identifier (e.g., xyz.doc.secure).

In various embodiments, an encrypted attachment is downloaded to the email client (e.g., client app 104). When the user tries to open the attachment, only the apps that registered for the secure extension and file type (e.g., MIME type) are presented to the user to open the attachment. The user selects, from among the authorized apps presented, an app to open the attachment.

In various embodiments, the app selected by the user to open an email attachment or other protected content receives the content and notices it is encrypted. The authorized app decrypts the document using the key provided to it previously, and allows the user to view or edit the content of the document. In various embodiments, even if an unauthorized app receives the encrypted document or other content it cannot open the document or otherwise provide access to the content because the app does not have the key to decrypt the document.

Figure 2:
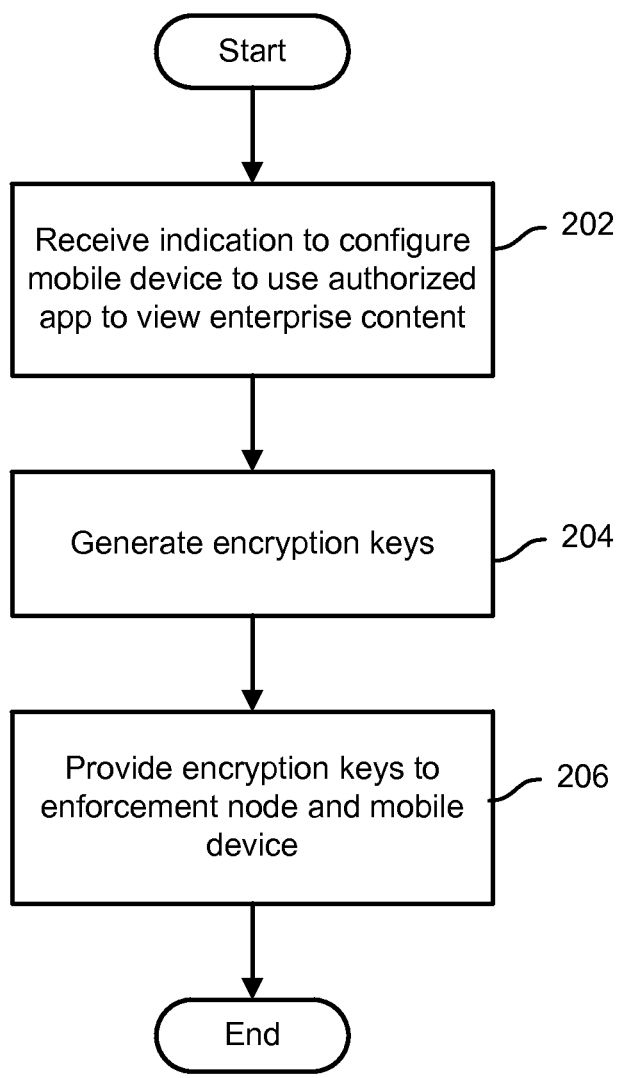
FIG. 2 is a flow chart illustrating an embodiment of a process to prevent unauthorized access to content downloaded to a mobile device.

FIG. 2 is a flow chart illustrating an embodiment of a process to prevent unauthorized access to content downloaded to a mobile device. In various embodiments, the process of FIG. 2 may be implemented on a security management platform, such as platform 118 of FIG. 1. In the example shown, an indication is received to configure a mobile device to use an authorized app to view or otherwise access enterprise or other protected content (202). For example, an indication may be received that an authorized enterprise user is registering a new mobile device to be used to access enterprise content. One or more encryption keys are generated (204). In some embodiments, an encryption key specific to one or more of the user, the mobile device, and the authorized viewer/app may be generated. The encryption keys are provided to a security enforcement node, such as node 110 of FIG. 1, and the mobile device (e.g., to the authorized app, in some embodiments via a trusted management agent on the mobile device) (206).

Figure 3:
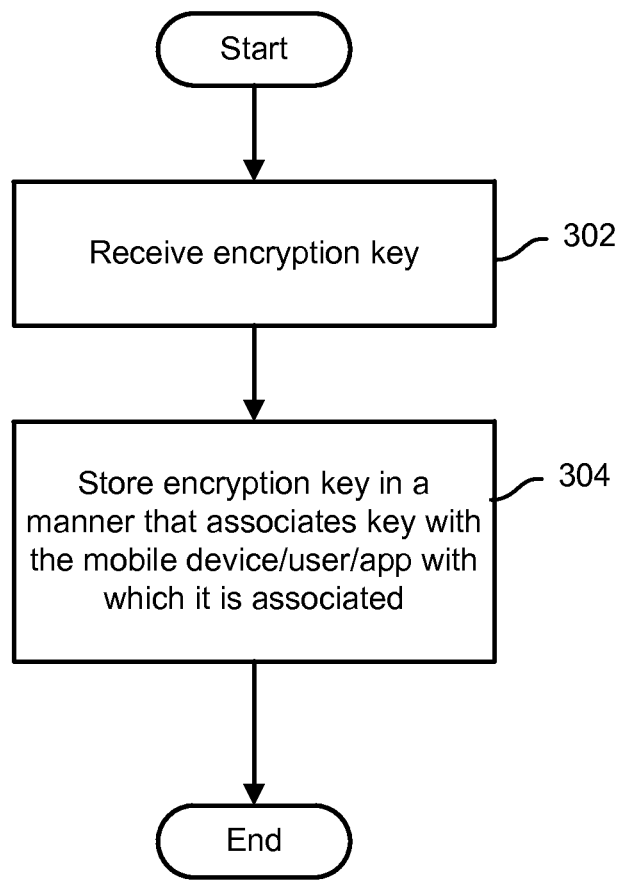
FIG. 3 is a flow chart illustrating an embodiment of a process to prevent unauthorized access to content downloaded to a mobile device.

FIG. 3 is a flow chart illustrating an embodiment of a process to prevent unauthorized access to content downloaded to a mobile device. In various embodiments, the process of FIG. 3 may be implemented on a security enforcement node, such as node 110 of FIG. 1. In the example shown, an encryption key to be used to encrypted protected content (e.g., email attachments, files, etc.) while in transit from an enterprise or other server to a mobile device is received (302). In various embodiments, the indication may include an identification of one or more of a user with which the key is associated, a mobile device with which the key is associated, a mobile client app with which the key is associated, and an authorized viewer/editor app with which the key is associated. The received key is stored in a manner that associates the key with the user, device, and/or app(s) with which it is associated (304). In various embodiments, the key is stored in a table or other data structure in a manner that enables the key to be retrieved and used to encrypt content data that is in transit to a user/mobile device with which the key is associated.

Figure 4:
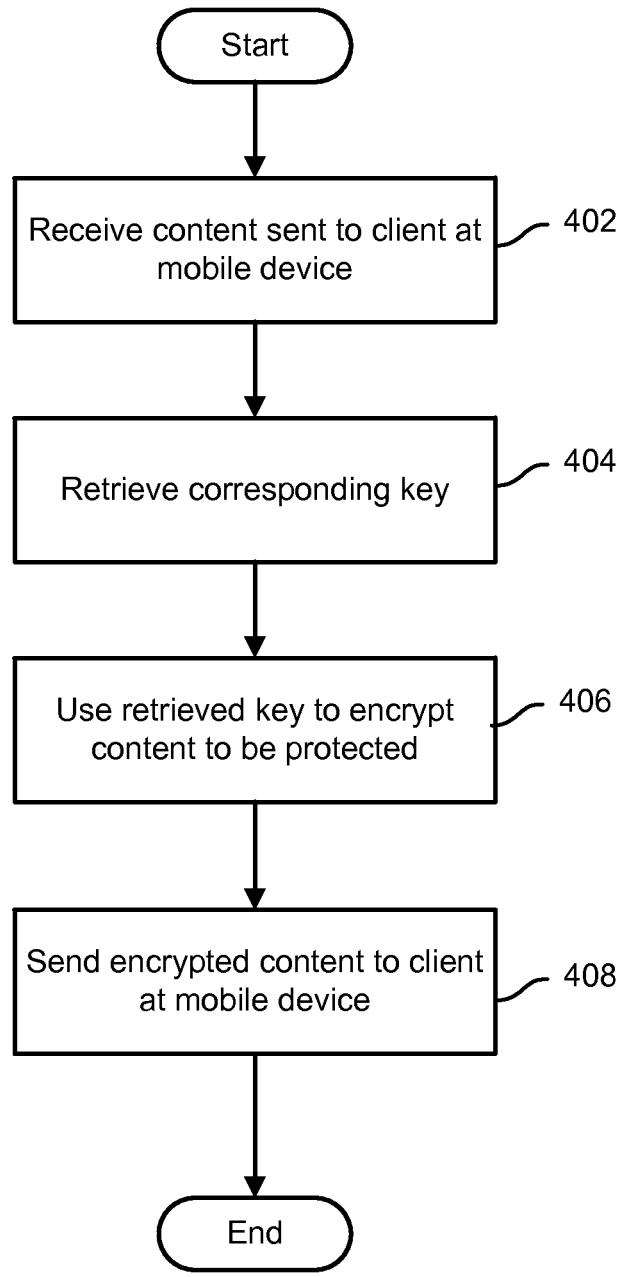
FIG. 4 is a flow chart illustrating an embodiment of a process to prevent unauthorized access to content downloaded to a mobile device.

FIG. 4 is a flow chart illustrating an embodiment of a process to prevent unauthorized access to content downloaded to a mobile device. In various embodiments, the process of FIG. 4 may be implemented on a security enforcement node, such as node 110 of FIG. 1. In the example shown, content to be sent to a client app at a mobile device, e.g., an email client, content management client, etc., is received (402). A corresponding encryption key is retrieved (404), e.g., based on a user, app, content and/or mobile device to which the content is in transit. The retrieved key is used to encrypt the content to be protected (406). For example, in some embodiments an email attachment but not the message body itself may be encrypted. In some embodiments, the message header, the message body, and email attachments can be encrypted selectively. The message or other communication, with the encrypted version of the protected content substituted in place of the original email attachment or other content, is sent to the client at the mobile device (408).

Figure 5:
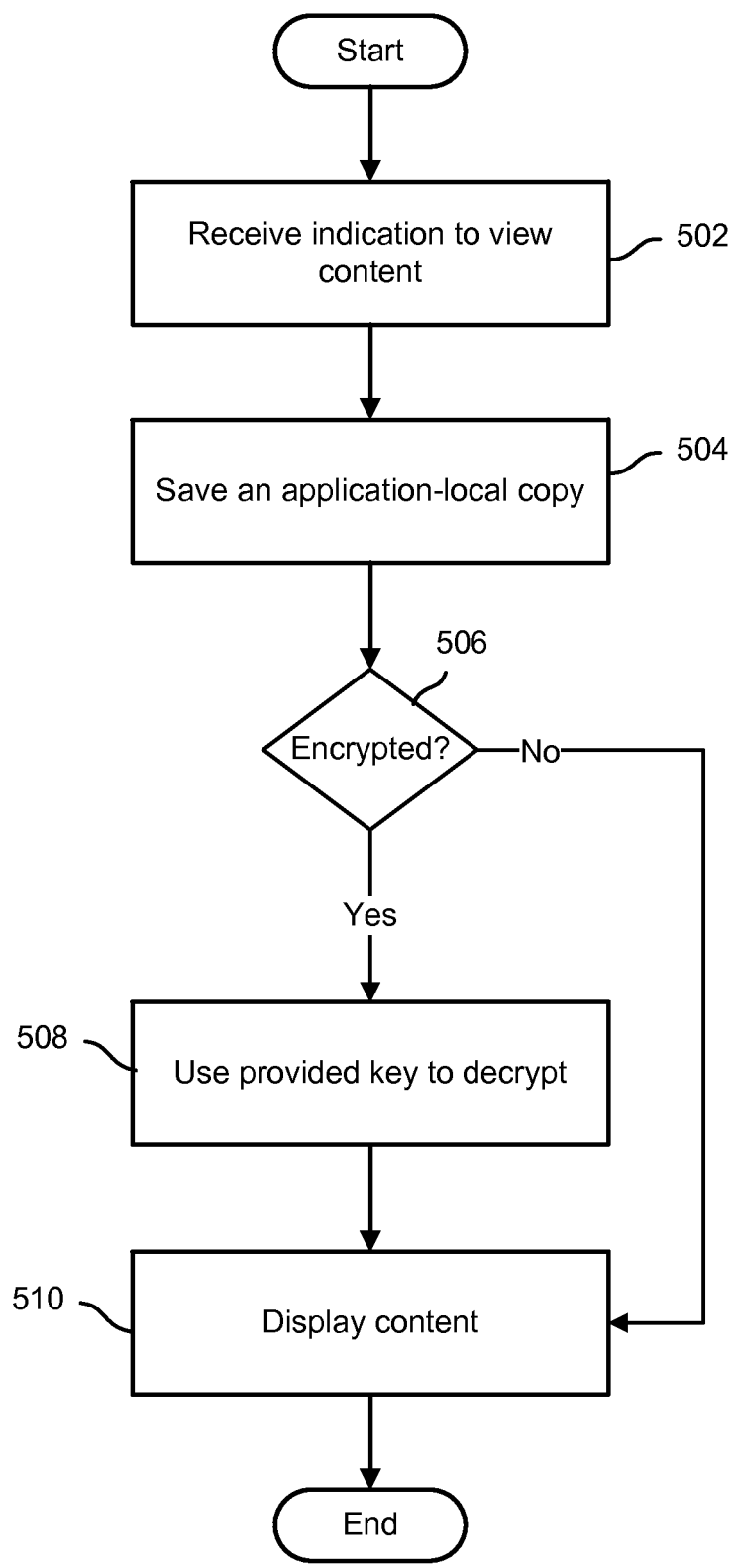
FIG. 5 is a flow chart illustrating an embodiment of a process to access protected content that has been downloaded to a mobile device.

FIG. 5 is a flow chart illustrating an embodiment of a process to access protected content that has been downloaded to a mobile device. In various embodiments, a viewer/app authorized to be used to access email attachments, files, or other protected content that has been downloaded from an enterprise or related server implements the process of FIG. 5. An indication to provide a view of content is received (502). For example, an authorized app may be launched upon being selected as an app to be used to open an email attachment or other downloaded content. An application-local copy of the content is saved (504), e.g., in a logical storage area that has been provided to the app to be used by the app to store its app content. The mobile app may be configured (e.g., by a DLL or other library, by wrapping or other modification, by inclusion of a security software development kit (SDK), etc.) to detect encryption and decrypt the content. If the content is determined to be encrypted (506), a corresponding key is used to decrypt the content (508). The decrypted content (506, 508), or the original content if not encrypted (506), is displayed (510). In some embodiments, if the content is encrypted and the authorized app uses a previously-provided key to decrypt the content (506, 508), the app may send a report, for example to a security management platform such as platform 118 of FIG. 1. In some embodiments, the security management platform may in turn store data indicating a copy of the content was made and stored locally by the app and/or may notify the security enforcement node (e.g., node 110 of FIG. 1) that the authorized app has been used to access the content. This report can be aggregated by security management platform 118 and reported and exported per content (e.g. attachment file), user, device, or app. In the case of a lost device, the enterprise can track potential data leakage, assess risk, and take security actions (e.g. selectively wipe data and/or apps, or wipe the entire device).

Figure 6:
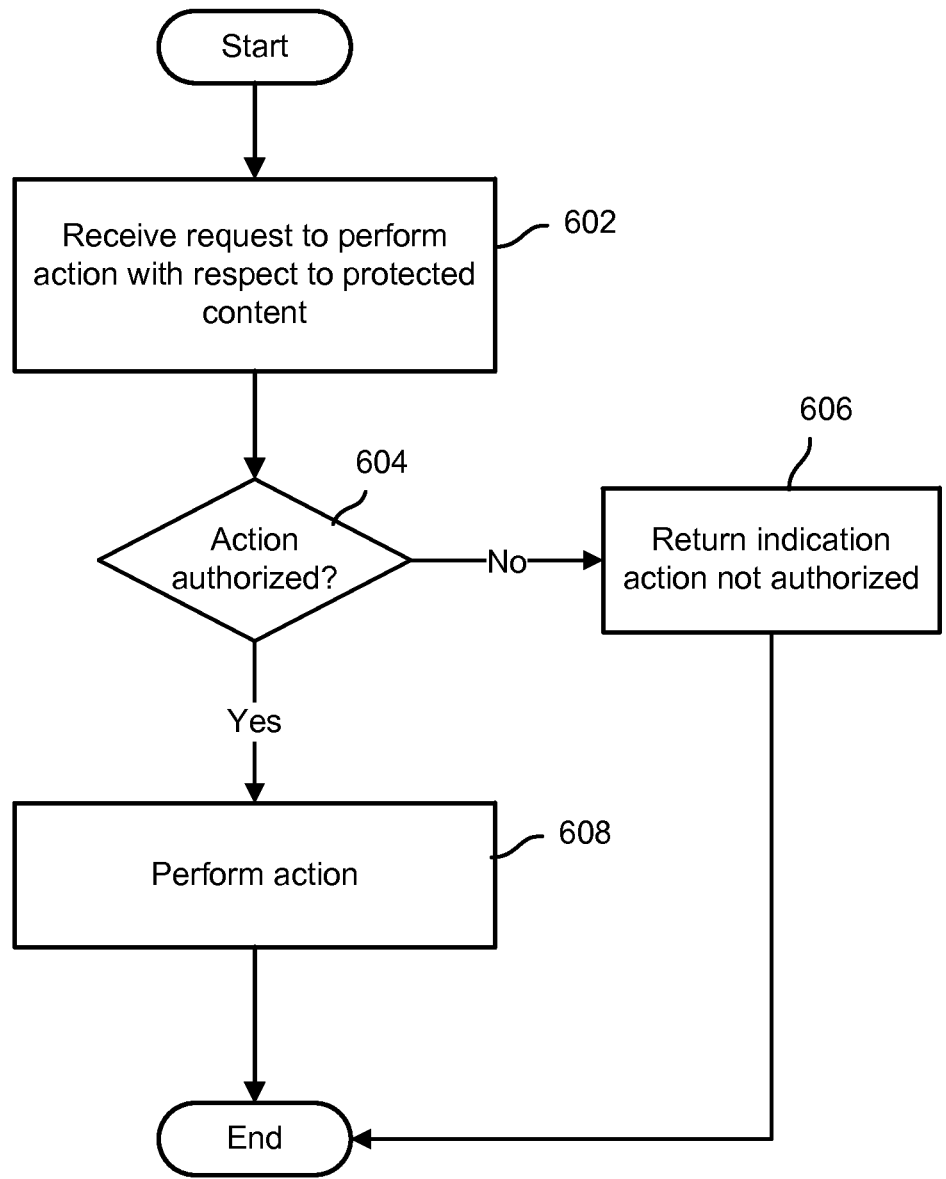
FIG. 6 is a flow chart illustrating an embodiment of a process to prevent unauthorized access to content downloaded to a mobile device.

FIG. 6 is a flow chart illustrating an embodiment of a process to prevent unauthorized access to content downloaded to a mobile device. In various embodiments, the process of FIG. 6 may be implemented by an app authorized to be used to provide authorized access to protected content. In the example shown, a request to perform a specific operation with respect to protected content is received (602). The authorized app determines whether the requested action is authorized to be performed at the mobile device (604). In some embodiments, for example, an inline security enforcement node, such as node 110 of FIG. 1, is configured to insert and/or otherwise associate with a protected content one or more tags indicating which actions are and/or are not allowed to be performed with respect to the content at a destination mobile device to which the protected content is in transit. For example, one or more tags indicating that a particular content may be viewed, but not edited, not shared, and/or not saved to the cloud may be affixed. The mobile app may be configured (e.g., by a DLL or other library, by wrapping or other modification, by inclusion of a security software development kit (SDK), etc.) to read the tags and use the tagged values to determine which actions are and/or are not authorized. If a requested action is determined by the viewer/app to be not authorized (604), the app provides an indication to the user that the action is not permitted (606), e.g., an error message. If the action is authorized with respect to the content (604), the action is performed (608).

Figure 7:
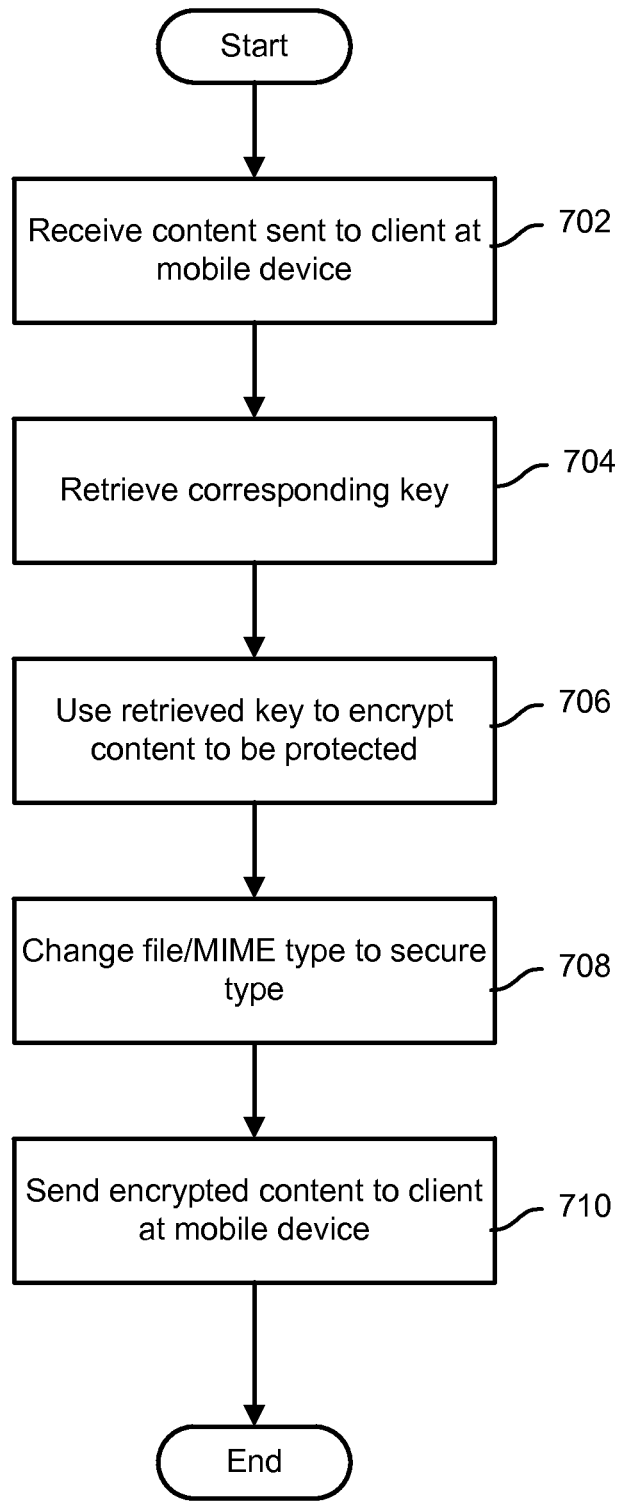
FIG. 7 is a flow chart illustrating an embodiment of a process to prevent unauthorized access to content downloaded to a mobile device.

FIG. 7 is a flow chart illustrating an embodiment of a process to prevent unauthorized access to content downloaded to a mobile device. In various embodiments, the process of FIG. 7 may be implemented on a security enforcement node, such as node 110 of FIG. 1. In the example shown, content to be sent to a client app at a mobile device, e.g., an email client, content management client, etc., is received (702). A corresponding encryption key is retrieved (704), e.g., based on a user, app, content, and/or mobile device to which the content is in transit. The retrieved key is used to encrypt the content to be protected (706). For example, an email attachment but not the message body itself may be encrypted. In addition, a content type of the protected content, e.g., a file extension and/or MIME or other content type, is changed to a secure type (708), which secure type is intended for registration and/or use only by authorized apps. The message or other communication, with the encrypted and otherwise modified version of the protected content substituted in place of the original email attachment or other content, is sent to the client at the mobile device (708).

At the mobile device, only authorized apps, e.g., those to which the identifier or other data that identifies the secure type has been provided, will in various embodiments be the only ones registered (or, at least, or likely to be registered) to be used to access content of that type. In some embodiments, changing the content type avoids the potentially undesirable user experience that could result, albeit without content being compromised, if an app not authorized to be used to view or otherwise access protected content were attempted to be used to view such content. Instead of receiving an error or being presented with garbled content, for example, an unauthorized app simply would not be displayed as an option to be used to open the attachment or other content.

Figure 8:
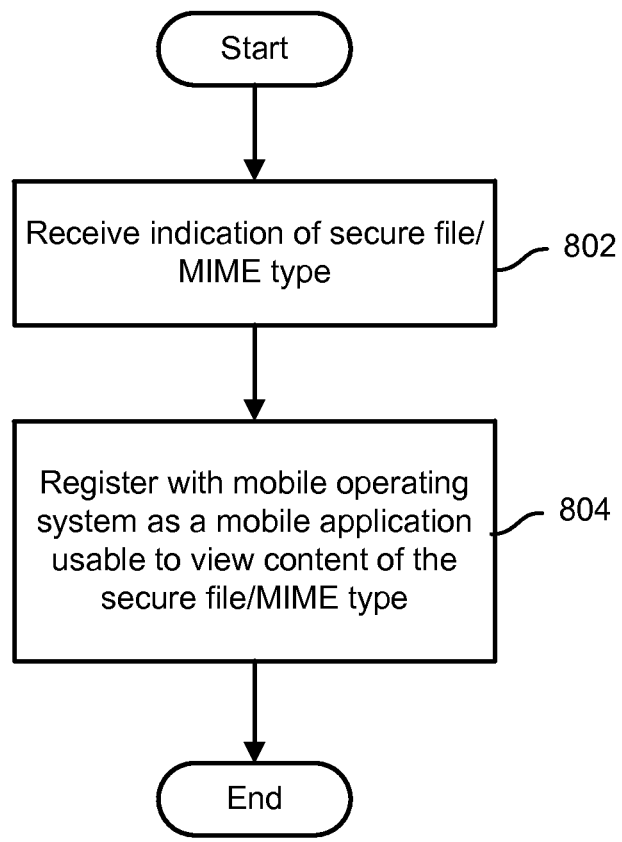
FIG. 8 is a flow chart illustrating an embodiment of a process to register to be used to access content of a secure type at a mobile device.

FIG. 8 is a flow chart illustrating an embodiment of a process to register to be used to access content of a secure type at a mobile device. In various embodiments, an app authorized to be used to provide access to protected content may perform the process of FIG. 8. In some embodiments, a version of an app configured to perform the process of FIG. 8 may be installed and/or updated, in some embodiments (e.g., Samsung Safe API, Apple iOS) in a manner transparent to a user of the mobile device. In various embodiments, an app may be caused to perform the process of FIG. 8 by having an administrator install a compliant version of the app; by requiring the app developer to use and/or incorporate an SDK comprising libraries and/or other code configured to perform the process of FIG. 8, etc. In the example shown, an indication of a secure content type (e.g., one or more of a secure file extension and/or MIME type) is received (802). The app registers with the mobile operating system as a mobile app usable to view content of the secure content type (804). In some embodiments, the secure type may be defined at least in part dynamically, for example at app install time, mobile device registration time, etc., in an effort to prevent developers of non-authorized apps from causing their app to register to be used with the secure type. Note, as indicated above, in various embodiments such apps would not be able to access the protected content, since they would not have the key required to decrypt the content.

Figure 9:
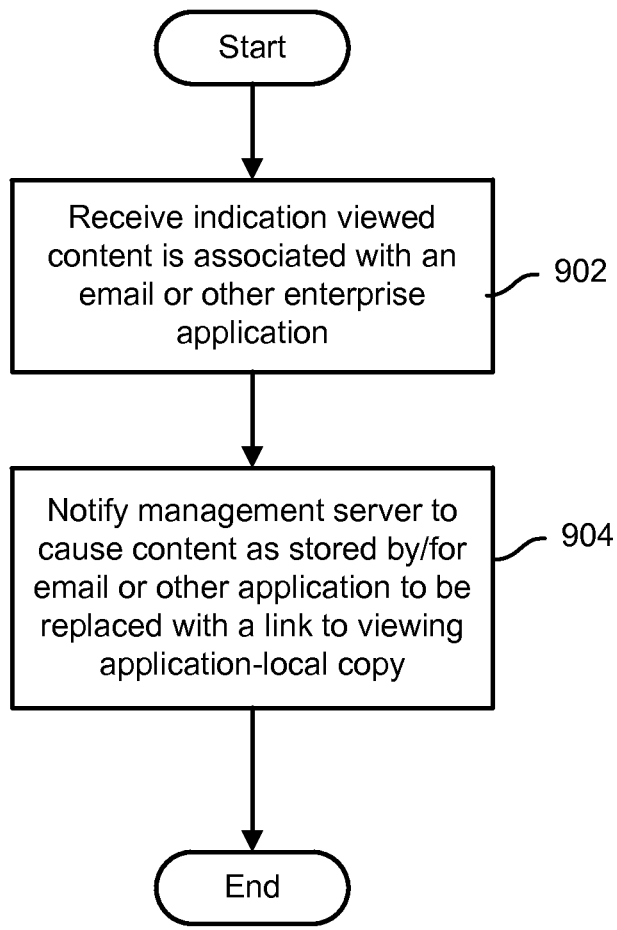
FIG. 9 is a flow chart illustrating an embodiment of a process to avoid duplicative storage of content downloaded to a mobile device.

FIG. 9 is a flow chart illustrating an embodiment of a process to avoid duplicative storage of content downloaded to a mobile device. In various embodiments, the process of FIG. 9 may be implemented by one or more of an authorized app, a management client/agent, and a management platform. In the example shown, an indication is received that content that an authorized app has been used to view at a mobile device was received at the mobile device by a mobile client associated with an enterprise email or other application, server, and/or service (902). For example, content the app was required to use a previously-provided key to decrypt, as described herein, may be determined on that basis to have been received at the mobile device as an email attachment. In some embodiments, a node external to the mobile device, such as a security management platform 118 or security enforcement node 110 as in FIG. 1, may determine that content an authorized app has been used to view arrived at the mobile device as an email attachment. In some embodiments, the determination may be made based at least in part on a file name, path, and/or other identifier associated with the content. A management server (or other node) is notified to cause the protected content as downloaded by the mobile client app that first downloaded the content to be replaced at the mobile device by a link to the application-local copy stored by the authorized app used to view the content (904). If the user accesses the content via the original client app, for example by selecting the link, in various embodiments the authorized app is launched and used to provide access by using the application-local copy stored by the authorized app.

Figure 10A:
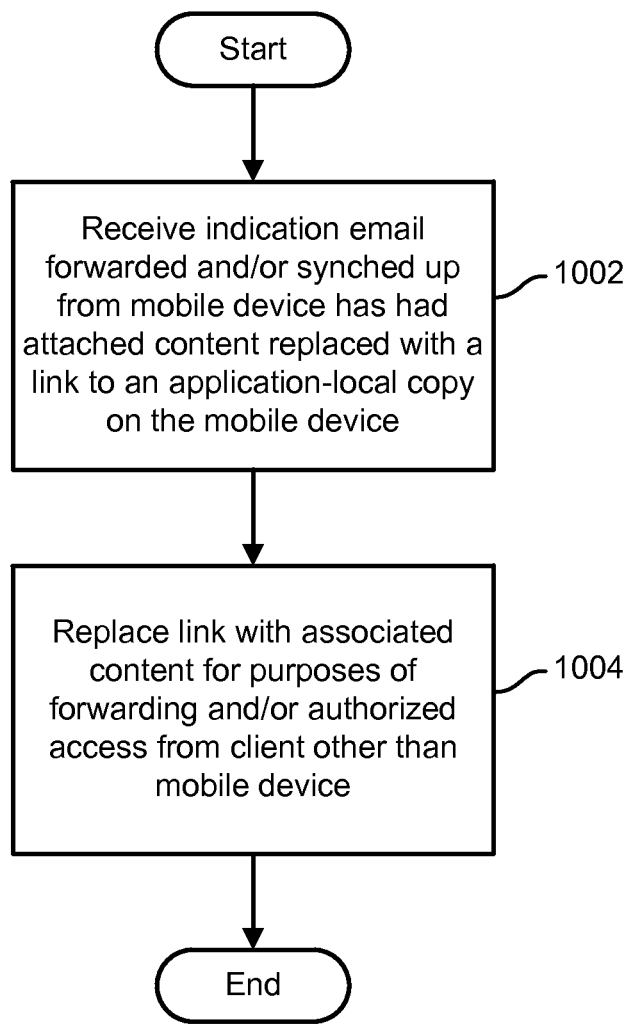
FIG. 10A is a flow chart illustrating an embodiment of a process to provide access to content that has been replaced by a link at a mobile device.

FIG. 10A is a flow chart illustrating an embodiment of a process to provide access to content that has been replaced by a link at a mobile device. In various embodiments, "SMART FORWARD" action is performed using the process of FIG. 10A, e.g., by a node such as security enforcement node 110 of FIG. 1. An indication is received that an email (or other content) in which a protected content has been replaced by a link to content as stored locally on a first mobile device is to be provided to a user at a second device, such as a desktop or other non-mobile client considered to be secure and/or a second mobile device (1002). To ensure proper (authorized) access to the content at the destination, the link is replaced prior to delivery to the second device with a properly-secured (if required) copy of the protected content (1004). For example, the content may be included in an unencrypted form if permitted at the destination (e.g., a desktop inside the enterprise secure zone or firewalled enterprise network), or replaced with the original content encrypted with a second key associated with the destination user/device. In some embodiments, a location of the original content as stored on the enterprise mail, file, or other server is included in the URL or other link to the application-local copy that is generated to replace the content in the original email or other communication.

Figure 10B:
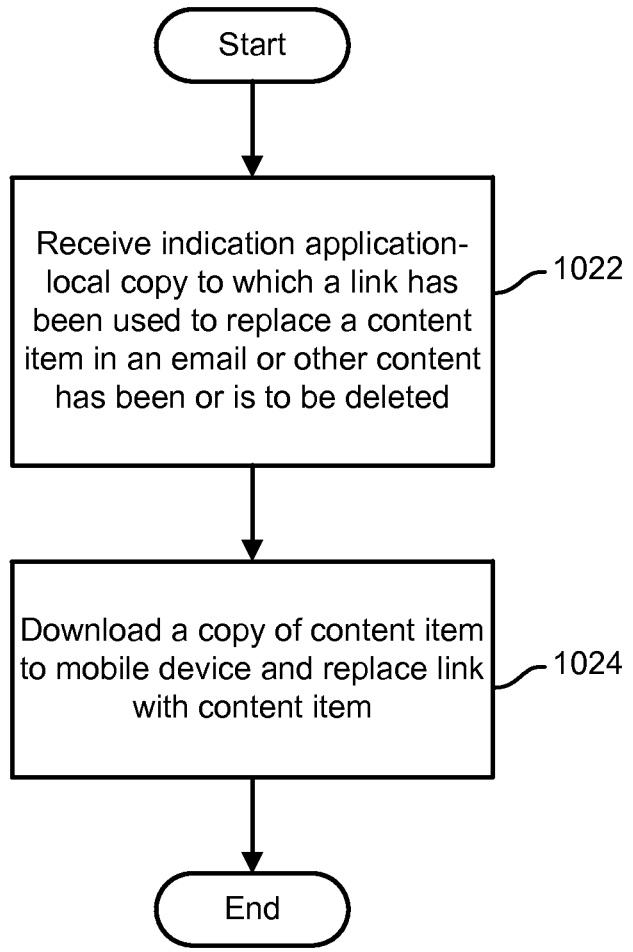
FIG. 10B is a flow chart illustrating an embodiment of a process to provide access to content that has been replaced by a link at a mobile device.

FIG. 10B is a flow chart illustrating an embodiment of a process to provide access to content that has been replaced by a link at a mobile device. In various embodiments, the process of FIG. 10B may be implemented by a node such as security enforcement node 110 of FIG. 1. An indication is received that an application-local copy of a content item to which a link has been used to replace the content item in an email (or other content) associated with another mobile client or application has been or is to be deleted (1022). For example, an indication may be received that the mobile application has been or is about to be deleted, which typically would result in the application's content data being deleted as well. Or, an indication may be received that the mobile application has been used to delete the content item, for example in response to a user action. In response to the indication, the link to the now or about to be deleted application-local copy of the content item is replaced with the content item (1024). For example, a copy of the content item may be downloaded from an enterprise server, such as an email or file server.

Figure 11:
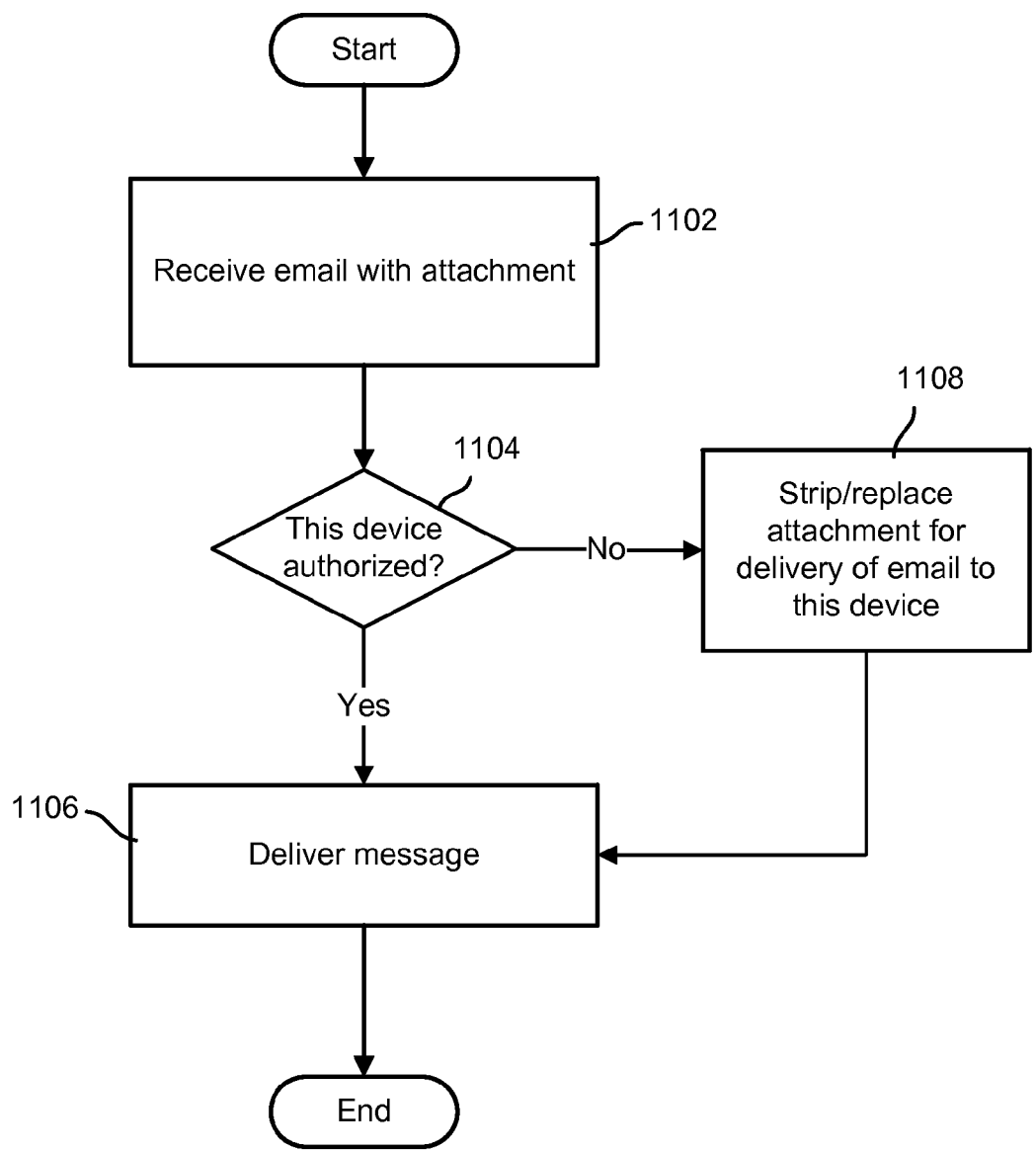
FIG. 11 is a flow chart illustrating an embodiment of a process to prevent unauthorized access to content via a mobile device.

FIG. 11 is a flow chart illustrating an embodiment of a process to prevent unauthorized access to content via a mobile device. In various embodiments, the process of FIG. 11 may be implemented by a security enforcement node, such as node 110 of FIG. 1. In the example shown, an email with an attachment is received (1102), e.g., one that is in transit to a mobile device to which the email is being synchronized using the Microsoft Exchange® ActiveSync or another synchronization protocol. It is determined whether the destination device is authorized to receive the attached content (1104). If so, the email is delivered (1106) with the content attached (e.g., protected by encryption and/or type modification, as disclosed herein). If not, the attachment is stripped off (or replaced) prior to delivery of the email to the destination device (1108).

Figure 12:
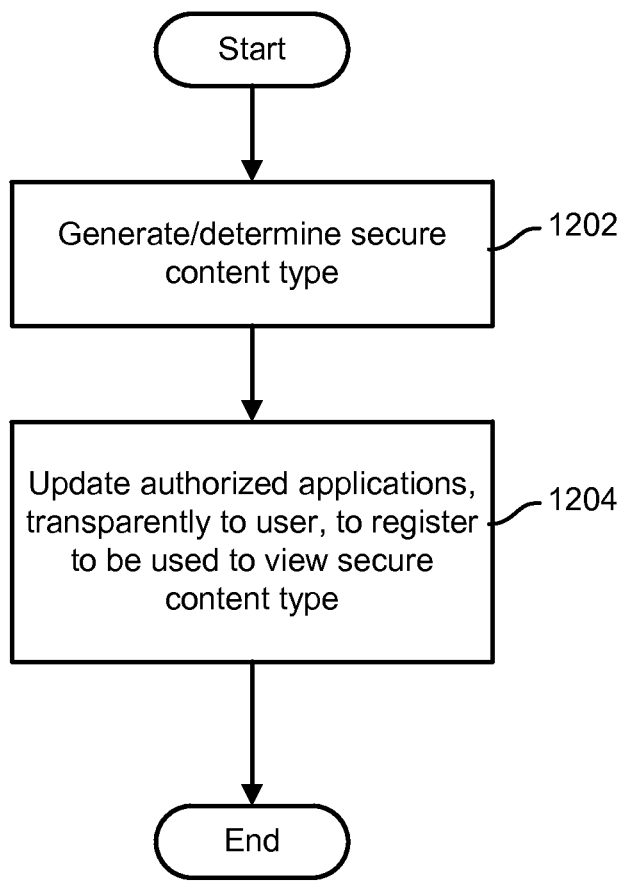
FIG. 12 is a flow chart illustrating an embodiment of a process to prevent unauthorized access to content downloaded to a mobile device.

FIG. 12 is a flow chart illustrating an embodiment of a process to prevent unauthorized access to content downloaded to a mobile device. In the example shown, a secure content type is generated and/or determined (1202). For example, a security management platform such as platform 118 of FIG. 1 may be configured to generate dynamically and/or for a particular enterprise, etc., a secure content type, such as a file extension and/or MIME type. One or more authorized apps may be installed and/or updated, transparently to the user, to be configured to register to be used to view content of the secure content type (1204). By generating a secure content type dynamically, in various embodiments, unauthorized use of and/or registration for the secure type may be avoided and/or made much more difficult.

Figure 13:
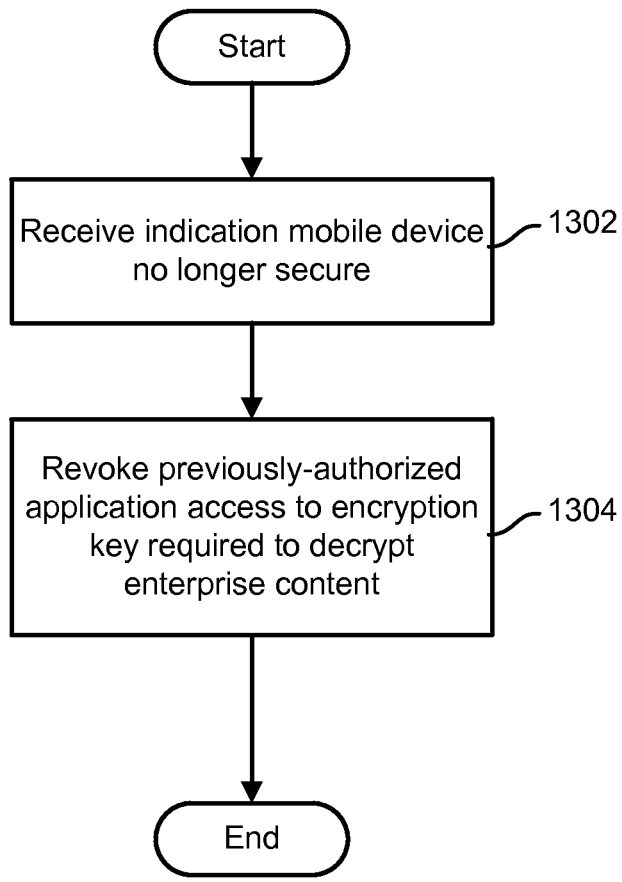
FIG. 13 is a flow chart illustrating an embodiment of a process to prevent unauthorized access to content downloaded to a mobile device.

FIG. 13 is a flow chart illustrating an embodiment of a process to prevent unauthorized access to content downloaded to a mobile device. An indication is received that a mobile device to which protected content has been downloaded, and/or at which one or more previously-authorized apps has been used to access protected content, is no longer in a secure state (1302). The ability of the previously-authorized app to access the protected content, including the application-local copy stored by the app, is revoked, e.g., by revoking access to the key required to decrypt the content (1304). In various embodiments, an authorized app is configured to store protected content persistently only in encrypted form. For example, an SDK, app wrapping, or other techniques may be used to ensure the authorized app stores the content only in encrypted form. In this way, revocation of access to the key required to decrypt the content will prevent the previously-authorized app from access the content in unencrypted form. Access to the key may be revoked, for example, by storing the actual encryption key in a secure location and providing the app only with a secret data usable to obtain beneficial use of the key, not with the key itself. The "lock" to the file in which the actual key is store may be change in some embodiments, or the file or other location in which the key is stored deleted, to revoke access to the key to apps on a mobile device that has been compromised, for example.

Using techniques disclosed herein, in various embodiments, secure access to protected content may be provided on mobile devices, without having protected information "leak" to unintended locations that are not secure, such as unauthorized apps and/or storage in an insecure form (e.g., unencrypted) and/or location (e.g., the cloud).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of protecting content data, comprising:
   receiving an indication that a content to be provided to a first mobile application on a mobile device is to be protected against unauthorized access at the mobile device using unauthorized applications other than the first mobile application, wherein the fist mobile application comprises a communication application and the content comprises an attachment to a communication message to be synchronized to the mobile device;
   determining whether the mobile device is authorized to receive the content;
   in the event the mobile device is authorized to receive the content, encrypting the content, using a key associated with a second mobile application authorized to be used to access the content at the mobile device, such that the content is accessible to the second mobile application on the mobile device and not to unauthorized applications on the mobile device; and
   in the event the mobile device is not authorized to receive the content, stripping the content from or replacing the content in the communication message prior to delivering the communication message to the mobile device.

2. The method of claim 1, wherein the key is associated with one or more of the following:

a user of the mobile device, a mobile application on the mobile device, the content, and the mobile device.

3. The method of claim 1, further comprising generating the key and providing the key to a security node configured to encrypt the content in transit to the mobile device and to the second mobile application.

4. The method of claim 3, wherein the key is provided to the second mobile application via a management agent installed on the mobile device.

5. The method of claim 1, wherein the second application is configured to use the key to decrypt the content at the mobile device.

6. The method of claim 1, wherein the second application is configured to store the content persistently at the mobile only in encrypted form.

7. The method of claim 1, wherein the communication application comprises an email application, the attachment to the communication message corresponds to an email attachment to an email message, and further comprising replacing the content as included in or otherwise associated with the email message as stored by the first mobile application on the mobile device with a link to an application-local copy of the content as stored by the second mobile application on the mobile device.

8. The method of claim 7, further comprising launching the second mobile application and using the second mobile application to provide access to the content, in response to an indication that the link has been selected.

9. The method of claim 7, further comprising replacing the link with the content in a copy of the email message sent to a destination other than the mobile device.

10. The method of claim 1, further comprising including in or with the content a tag or other metadata indicating one or more of an action authorized to be performed with respect to the content at the mobile device using the second mobile application and an action not authorized to be performed with respect to the content at the mobile device using the second mobile application.

11. The method of claim 10, wherein the second mobile application is configured to use the tag or other metadata to determine at the mobile device, in response to a request to perform a requested action, whether the requested action is permitted to be performed with respect to the content at the mobile device.

12. The method of claim 1, further comprising associating the content with a secure content type.

13. The method of claim 12, wherein the second mobile application is configured to register itself to be used to access content of the secure content type.

14. The method of claim 12, wherein the secure content type comprises one or more of a file extension and a MIME type.

15. The method of claim 1, further comprising receiving an indication that the mobile device has been compromised, and revoking access by the second mobile application to the key required to decrypt the content.

16. The method of claim 1, further comprising configuring the second mobile application to use the key to provide authorized access to the content.

17. The method of claim 1, wherein the content comprises one or more of an email attachment, a document, a file, and a stored content object.

18. The method of claim 1, wherein the content comprises an email message and encrypting the content includes selectively encrypting one or more of a message header, a message body, and at least a selected subset of email attachments comprising the email message.

19. The method of claim 1, wherein the key associated with a second mobile application is encrypted prior to being sent to the mobile device and a Common Access Card or other physical article must be connected to the mobile device to enable the second mobile application to access and use the key to decrypt the content at the mobile device access.

20. A system, comprising:
- a communication interface configured to receive a content to be provided to a first mobile application on a mobile device; and
- a processor coupled to the communication interface and configured to:
    - determine that the content is to be protected against unauthorized access at the mobile device using unauthorized applications other than the first mobile application, wherein the first mobile application comprises a communication application and the content comprises an attachment to a communication message to be synchronized to the mobile device;
    - determine whether the mobile device is authorized to receive the content;
    - in the event the mobile device is authorized to receive the content, encrypt the content, using a key associated with a second mobile application authorized to be used to access the content at the mobile device, such that the content is accessible to the second mobile application on the mobile device and not to unauthorized applications on the mobile device; and
    - in the event the mobile device is not authorized to receive the content, strip the content from or replace the content in the communication message prior to delivering the communication message to the mobile device.

21. The system of claim 20, wherein the communication application comprises an email application, the attachment to the communication message corresponds to an email attachment to an email message, and the processor is further configured to replace the content as included in or otherwise associated with the email message as stored by the first mobile application on the mobile device with a link to an application-local copy of the content as stored by the second mobile application on the mobile device.

22. The system of claim 20, wherein the key is associated with one or more of the following: a user of the mobile device, a mobile application on the mobile device, the content, and the mobile device.

23. A computer program product embodied in a tangible, non-transitory computer readable storage medium and comprising computer instructions for:
- receiving an indication that a content to be provided to a first mobile application on a mobile device is to be protected against unauthorized access at the mobile device using unauthorized applications other than the first mobile application, wherein the first mobile application comprises a communication application and the content comprises an attachment to a communication message to be synchronized to the mobile device;
- determining whether the mobile device is authorized to receive the content;
- in the event the mobile device is authorized to receive the content, encrypting the content, using a key associated with a second mobile application authorized to be used to access the content at the mobile device, such that the content is accessible to the second mobile application on the mobile device and not to unauthorized applications on the mobile device; and
- in the event the mobile device is not authorized to receive the content, stripping the content from or replacing the content in the communication message prior to delivering the communication message to the mobile device.

24. The computer program product of claim 23, wherein the key is associated with one or more of the following: a user of the mobile device, a mobile application on the mobile device, the content, and the mobile device.

25. The method of claim 1, wherein the encrypting of the content comprises:
- determining whether the content corresponds to protected data; and
- in the event that the content corresponds to protected data, encrypting the protected data.

26. The method of claim 1, wherein the content is encrypted by an intermediary node between a node from which the content is sent and the mobile device.

* * * * *